US012667852B2

(12) United States Patent
Gabella et al.

(10) Patent No.: US 12,667,852 B2
(45) Date of Patent: Jun. 30, 2026

(54) SHOWER HEAD INSERT

(71) Applicant: L'OREAL, Paris (FR)

(72) Inventors: Thomas Gabella, Lausanne (CH); Nicolas Ganshof Van Der Meersch, Morges (CH)

(73) Assignee: L'OREAL, Paris (FR)

( * ) Notice: Subject to any disclaimer, the term of this patent is extended or adjusted under 35 U.S.C. 154(b) by 625 days.

(21) Appl. No.: 17/642,532

(22) PCT Filed: Sep. 11, 2020

(86) PCT No.: PCT/EP2020/075575
§ 371 (c)(1),
(2) Date: Mar. 11, 2022

(87) PCT Pub. No.: WO2021/048425
PCT Pub. Date: Mar. 18, 2021

(65) Prior Publication Data

US 2022/0323974 A1 Oct. 13, 2022

(30) Foreign Application Priority Data

Sep. 11, 2019 (GB) ...................................... 1913116

(51) Int. Cl.
*B05B 1/18* (2006.01)
*B05B 1/20* (2006.01)
*B05B 1/26* (2006.01)

(52) U.S. Cl.
CPC .............. *B05B 1/185* (2013.01); *B05B 1/202* (2013.01); *B05B 1/26* (2013.01)

(58) Field of Classification Search
CPC ........... B05B 1/26; B05B 1/185; B05B 1/202; B05B 1/18

(Continued)

(56) References Cited

U.S. PATENT DOCUMENTS 4,284,239 A * 8/1981 Ikeuchi .................. C03B 27/02 239/432
4,415,123 A 11/1983 Ikeuchi
(Continued)

FOREIGN PATENT DOCUMENTS

CN 205701137 U 11/2016
EP 2204508 A2 7/2010
(Continued)

OTHER PUBLICATIONS

International Search Report and Written Opinion in International Application No. PCT/EP2020/075575, mailed Dec. 3, 2020 (14 pages).

*Primary Examiner* — Jason J Boeckmann
(74) *Attorney, Agent, or Firm* — Bookoff McAndrews, PLLC

(57) ABSTRACT

A shower head insert comprises at least two water nozzle cartridges, each having at least two nozzles configured to produce water jets that impact to atomise the liquid producing droplets of water, and an injection moulded water distribution system to supply liquid to the at least two water nozzle cartridges. The water distribution system comprises at least two sockets for receiving the water nozzle cartridges, a central water inlet conduit in liquid communication with the first socket, and a narrow bore conduit providing high pressure liquid communication between the first and second sockets. The narrow bore conduit is configured to allow removal of conduit inner mould needles from the conduit after injection moulding through an open end of the sockets and in one embodiment comprises an upwardly depending section and downwardly depending sections. A shower head or shower head assembly comprising the shower head insert, and a water nozzle cartridge for the shower head insert, are also provided.

21 Claims, 5 Drawing Sheets

(58) Field of Classification Search
USPC .......................................... 239/433, 557, 565
See application file for complete search history.

(56) References Cited

U.S. PATENT DOCUMENTS

| | | | |
|---|---|---|---|
| 5,397,064 | A | 3/1995 | Heitzman |
| 2004/0217209 | A1 * | 11/2004 | Bui ....................... B05B 1/1654 239/548 |
| 2008/0223957 | A1 | 9/2008 | Schorn |
| 2018/0043377 | A1 * | 2/2018 | Xu ............................ B05B 1/26 |
| 2022/0040713 | A1 * | 2/2022 | Mock ...................... B05B 15/65 |

FOREIGN PATENT DOCUMENTS

| | | | |
|---|---|---|---|
| GB | 2033251 | A | 5/1980 |
| WO | 2011054120 | A2 | 5/2011 |

* cited by examiner

Fig 4A (COMPARATIVE)
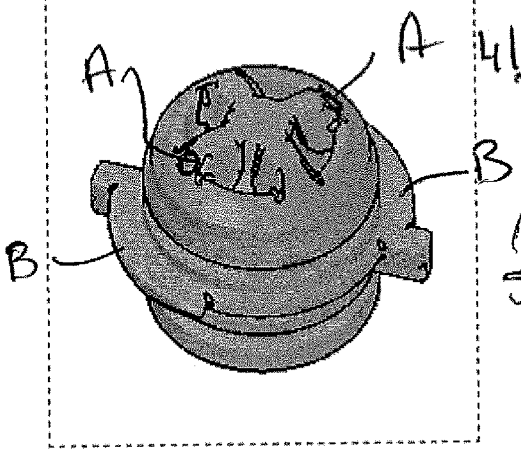
Fig. 5A
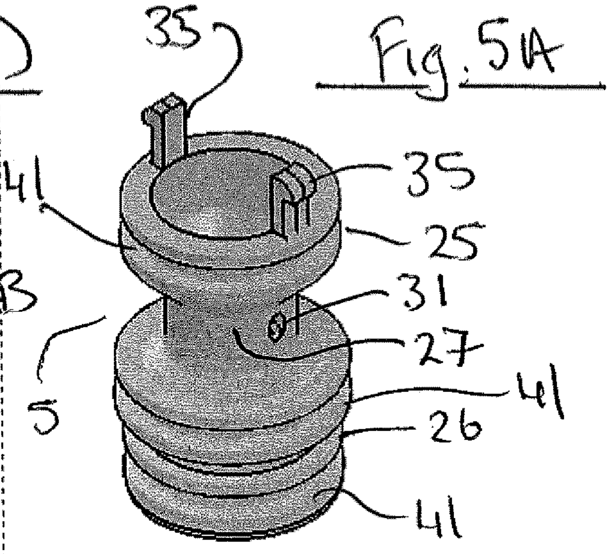
Fig. 4B (COMPARATIVE)
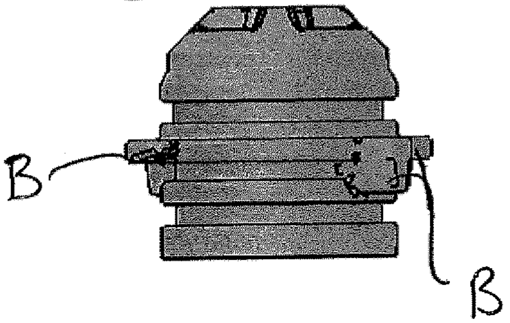
Fig. 5B
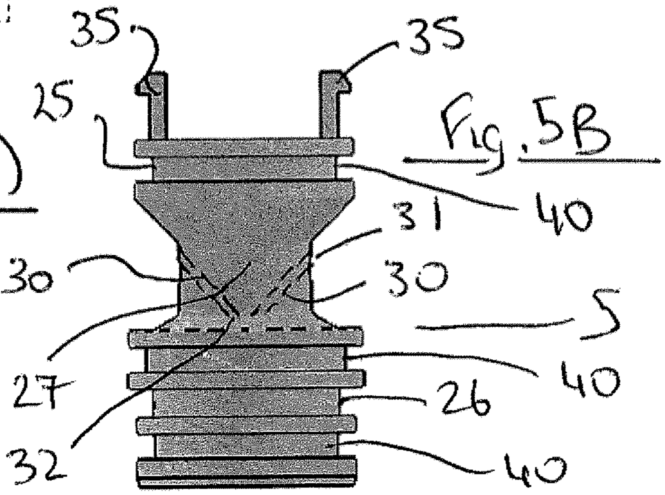

12A
12C
11
14
12B
3

12C
35

17
12A
41
11
35
36
12B
5
18A
5

SHOWER HEAD INSERT

FIELD OF THE INVENTION

The present invention relates to a shower head insert for a shower head of the type that produces atomised droplets of water from impinging jets of high-pressure water

BACKGROUND TO THE INVENTION

Water-saving shower heads that employ lower volumes of water at higher pressures are described in EP2204508. The shower heads employ at least one nozzle body having at least two nozzles configured to produce water jets that impact to atomise the liquid producing atomised droplets of water. The shower heads are reported to use 2 l/min of water as opposed to up to 11 l/min with a convention shower head. Nozzle bodies are illustrated in FIGS. 13 and 14 of EP2204508 and in WO2011/054120. Shower heads including more than one nozzle body are produced by the company Gjosa SA. In this design, a shower insert is provided having three nozzle bodies (cartridges) and a water distribution system including three cartridge-receiving sockets configured for distributing water to the cartridges at about 3 Bar. The water distribution system has a central water inlet conduit in fluid communication with a first cartridge-receiving socket, and second and third cartridge-receiving sockets in fluid communication with the first cartridge-receiving socket via narrow bore conduits. The three cartridge-receiving sockets are disposed around a central part of the water distribution system, and the narrow bore conduits curve around the central section. The fact that the narrow bore conduits are curved means that the water distribution system cannot be injection moulded in one piece, as this would prevent removal of the inner mould. The central section includes means for fixing the system to the shower head body, and once is it fixed to the shower head body, a sealing closure is applied over the central section to fluidically seal the narrow bore conduits supplying high pressure water from the first socket to the second and third conduits. Each of the sockets has a closed top and open bottom parts, and the cartridges are configured to be inserted into the sockets from the bottom and screwed into position in the socket. High pressure water enters each socket at a top headspace and two small holes at the top of each nozzle body.

The water distribution system therefore has six parts, the main body that is injection moulded, a sealing closure of the central section, a sealing O-ring, and three screws, and needs to be assembled prior to insertion of the cartridges. It would be preferable to provide the water distribution system as a one-part injection moulded part. In addition, the cartridges are designed to receive pressurised water through nozzles at the top of the cartridge, which results in a downward pressure being exerted in the cartridge in the socket, with the associated risk that the cartridge is forced out of the socket into contact with a user.

Shower head inserts are described in U.S. Pat. No. 4,415,123, GB2033251, US2008223957 and U.S. Pat. No. 5,397,064.

It is an object of the invention to overcome at least one of the above-referenced problems.

SUMMARY OF THE INVENTION

The present invention provides an insert for a shower head of the above-referenced type, that addresses the problems of the prior art by having, in one embodiment, a water distribution system that can be injection moulded in one piece. This is achieved by re-designing of the water distribution system so that the narrow conduit between the first and second sockets in configured to allow removal of inner mould inserts (needles) from the conduit through an open end of the sockets after injection moulding. In the embodiments shown the conduit is angled and comprises a straight upwardly depending section and downwardly depending sections that allows the inner mould inserts (needles) to be removed from each end of the conduit through the open part of the sockets. This is illustrated in FIG. 6B which shows the upwardly depending section of the conduit disposed at an angle to allow a first inner mould needle (not shown) be removed from the conduit after injection moulding through the open bottom end of the first socket. The same can be done for the second and third inner mould needles which are used to injection mould the downwardly second and third conduits.

In a first aspect, the invention provides a shower head insert of the type comprising:

at least two water nozzle cartridges, each of the type having at least two nozzles configured to produce water jets that impact to atomise the liquid producing droplets of water; and an injection moulded water distribution system to supply high pressure liquid to the at least two water nozzle cartridges, the water distribution system comprising:

at least two sockets for receiving the water nozzle cartridges and having at least one open end, a central water inlet conduit in liquid communication with the first socket, and a narrow bore conduit providing high pressure liquid communication between the first and second sockets, wherein the narrow bore conduit is configured to allow removal of conduit inner mould needles from the conduit through the at least one open end of the sockets after injection moulding.

In another aspect, the invention provides a water distribution system for a shower head insert of the type comprising at least two water nozzle cartridges, each having at least two nozzles configured to produce water jets that impact to atomise the liquid producing droplets of water, the water distribution system comprising:

at least two sockets for receiving the water nozzle cartridges, a central water inlet conduit in liquid communication with the first socket, and a narrow bore conduit providing high pressure liquid communication between the first and second sockets, wherein the narrow bore conduit is configured to allow removal of conduit inner mould needles from the conduit through the at least one open end of the sockets after injection moulding.

In one embodiment, the narrow bore conduit is angled and typically has a first section (i.e. proximal section) in fluid communication with the first socket and at least one second section (i.e. distal section) in fluid communication with at least the second socket that are not co-axial.

In one embodiment, the first section is upwardly depending and the or each second section(s) is downwardly depending. This is illustrated in FIGS. 8A and 8B, showing upwardly depending section 17 and two downwardly depending sections 18. In this embodiment, the inner mould needles are removed through the open bottom end of the sockets.

In another embodiment, the first section is downwardly depending and the second sections are upwardly depending. In this embodiment, inner mould needles may be removed through an open top of the sockets.

In one embodiment, the sockets are open at both ends.

In one embodiment, the water distribution system comprises at least three sockets for receipt of water nozzle cartridges, wherein the narrow bore conduit comprises an upwardly depending section and at least two downwardly depending sections. The conduit may be generally tripod shaped, as shown in FIG. 6A.

The shower head insert may comprise three, four or more cartridges, and a water distribution system comprising sockets for receipt of the three, four or more conduits. In most embodiments, the narrow bore conduit is branched to provide pressurised liquid from the first socket to the other sockets. However, an insert having a water distribution system that includes more narrow bore conduits is within the scope of the invention.

In one embodiment, the water distribution system comprises at least three sockets for receipt of water nozzle cartridges, wherein the narrow bore conduit comprises a proximal upwardly depending section and at least two distal downwardly depending sections.

In one embodiment, each water nozzle cartridge is configured to fit within the socket in a fluidically tight manner and comprises a waist section that defines a channel for water around the water nozzle cartridge when the cartridge is fitted in the socket, whereby the central water inlet conduit and the proximal section of the narrow bore conduit are in fluid communication with the channel. This provides for the supply of pressurised water into the socket at a middle section of the socket, exerting equal upward and downward forces on the cartridge in the socket which in practice cancel each other out and thereby stabilise the cartridge in the socket. This is an advantage over the prior art, where the cartridge and socket are designed to provide a headspace above the cartridge for receipt of pressurised water, which in practice exerts a downward force on the cartridge, with the resultant risk of ejection of the cartridge from the shower head resulting injury to the user.

In one embodiment, the upper and lower (skirt) sections of the cartridge comprise sealing means to fluidically seal the channel around the cartridge. In one embodiment, the sealing means comprise one or resiliently deformable sealing rings. In one embodiment, the upper and lower sections comprise sealings rings, and optionally annular sockets to seat the annular sealings rings. In one embodiment, the upper section comprises one annular sealing ring and the lower section comprises two or more annular sealing rings. In one embodiment, the annular sealing rings in the lower section of the cartridge are of different diameter, with the diameter of the sealing rings increasing towards a bottom of the lower section.

In one embodiment, the inlets for each of the two nozzles of each water nozzle cartridge are disposed in the waist section of the water nozzle cartridge, typically on opposite sides of the waist section. In one embodiment, the lower section of the cartridge is hollow and the nozzle outlets are configured to produce water jets that impinge within the hollow lower section.

In one embodiment, the water nozzle cartridge is configured to snap-fit into the socket.

In one embodiment, the water nozzle cartridge comprises upwardly depending arms configured to engage a top of the socket.

In one embodiment, the insert comprises a base fitting configured to attach to a shower head body and clip to the water distribution system.

In one embodiment, the water nozzle cartridges are injection moulded.

In another aspect, the invention provides a shower head comprising a shower head insert according to the invention disposed within a shower head body, wherein the shower head body typically comprises an upper part and a lower part that clip together to enclose the shower head insert Typically, one of the upper or lower parts (generally the lower part) is configured for coupling to the base fitting, typically by means of a snap-fit arrangement. In one embodiment, the shower head body is overmoulded around the shower head insert.

In another aspect, the invention provides a water nozzle cartridge having a body configured to fit in a socket of the shower head in a fluidically tight manner and comprising at least two nozzles configured to produce water jets that impact to atomise the liquid producing droplets of water, the body having an upper section, a lower section and a waist section that defines a channel for liquid around the water nozzle cartridge when the cartridge is fitted in the socket. Inlets for the nozzles are disposed on an outer surface of the waist section. The lower section may be hollow to provide a skirt section, and nozzle outlets may be configured to directs the water jets into the skirt section to impinge in the skirtsection. This produces a homogenous jet of liquid having a homogenous droplet size. Generally, the skirt extends below the point where the jets of liquid impinge. In one embodiment, the upper and lower sections of the cartridge comprise sealing means to fluidically seal the channel around the cartridge. In one embodiment, the sealing means comprise one or resiliently deformable sealing rings. In one embodiment, the upper and lower sections comprise annular sockets to seat annular sealings rings. In one embodiment, the upper section comprises one annular sealing ring and the lower section comprises two or more annular sealing rings. In one embodiment, the annular sealing rings in the lower section of the cartridge are of different diameter, with the diameter of the sealing rings increasing towards a bottom of the lower section.

In one embodiment, the water nozzle cartridge is configured to snap-fit into the socket.

In one embodiment, the water nozzle cartridge comprises upwardly depending arms configured to engage a top of the socket.

In another aspect, the invention provides a shower head insert of the type comprising:

at least two water nozzle cartridges, each of the type having at least two nozzles configured to produce water jets that impact to atomise the liquid producing droplets of water; and an injection moulded water distribution system to supply pressurised liquid to the at least two water nozzle cartridges comprising at least two sockets for receiving the water nozzle cartridges, a central water inlet conduit in liquid communication with the first socket, and a narrow bore conduit providing high pressure liquid communication between the first and second sockets, wherein each water nozzle cartridge is configured to fit within the socket in a fluidically tight manner and comprises a body having an upper section, a hollow lower section and a waist section that defines a channel for liquid around the water nozzle cartridge when the cartridge is fitted in the socket, wherein each nozzle comprises a nozzle inlet (31)

disposed on an outer surface of the waist section, and a nozzle outlet (32) configured to direct the water jet into the hollow lower section.

In one embodiment, the upper and lower sections of the cartridge comprise sealing means to fluidically seal the channel around the cartridge. In one embodiment, the sealing means comprise one or more resiliently deformable sealing rings. In one embodiment, the upper and lower sections comprise annular sockets to seat annular sealings rings. In one embodiment, the upper section comprises one annular sealing ring and the lower section comprises two or more annular sealing rings. In one embodiment, the annular sealing rings in the lower section of the cartridge are of different diameter, with the diameter of the sealing rings increasing towards a bottom of the lower section.

In one embodiment, the lower section of the cartridge is hollow and outlets for the nozzles are configured to produce jets of water that impinge in the hollow lower section to atomise the droplets.

In another aspect, the invention provides a method of forming a shower head of the invention comprising the steps of injection moulding the water distribution system, removing the inner mould needles for the narrow bore conduit from the injected moulded water distribution system through an open end of the sockets, and assembling the components to forms the shower head.

Other aspects and preferred embodiments of the invention are defined and described in the other claims set out below.

BRIEF DESCRIPTION OF THE FIGURES

FIGS. 4A and 4B (comparative) are views of a water nozzle cartridge of the prior art;

FIGS. 5A and 5B are views of a water nozzle cartridge of the invention and forming part of the insert of the invention;

DETAILED DESCRIPTION OF THE INVENTION

All publications, patents, patent applications and other references mentioned herein are hereby incorporated by reference in their entireties for all purposes as if each individual publication, patent or patent application were specifically and individually indicated to be incorporated by reference and the content thereof recited in full.

Definitions and General Preferences

Where used herein and unless specifically indicated otherwise, the following terms are intended to have the following meanings in addition to any broader (or narrower) meanings the terms might enjoy in the art:

Unless otherwise required by context, the use herein of the singular is to be read to include the plural and vice versa. The term "a" or "an" used in relation to an entity is to be read to refer to one or more of that entity. As such, the terms "a" (or "an"), "one or more," and "at least one" are used interchangeably herein.

As used herein, the term "comprise," or variations thereof such as "comprises" or "comprising," are to be read to indicate the inclusion of any recited integer (e.g. a feature, element, characteristic, property, method/process step or limitation) or group of integers (e.g. features, element, characteristics, properties, method/process steps or limitations) but not the exclusion of any other integer or group of integers. Thus, as used herein the term "comprising" is inclusive or open-ended and does not exclude additional, unrecited integers or method/process steps.

It will be appreciated that the water nozzle cartridge and water distribution system of the present invention may be used with liquids other than water, for example aqueous and non-aqueous solutions such as detergent, cosmetic and dermatology compositions.

Exemplification

The invention will now be described with reference to specific Examples. These are merely exemplary and for illustrative purposes only: they are not intended to be limiting in any way to the scope of the monopoly claimed or to the invention described. These examples constitute the best mode currently contemplated for practicing the invention.

Figure 6:
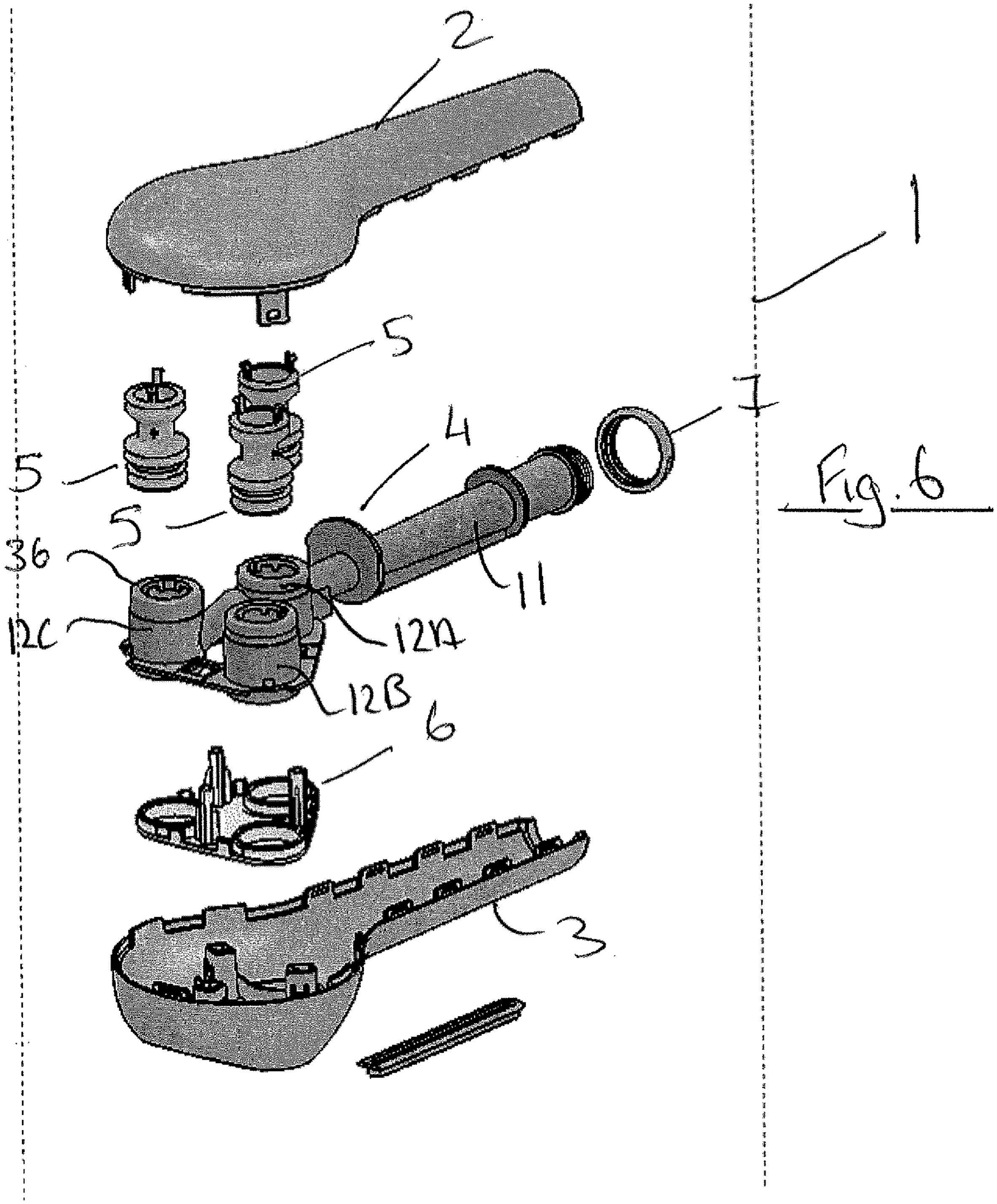
FIG. 6 is an exploded view of the shower head of FIG. 1 showing the two-part shower head body, the water distribution system, three water nozzle cartridges, and the base fitting.

Referring to FIG. 6, there is illustrated a shower head according to the invention indicated generally by the reference numeral 1 and comprising a shower body with an upper part 2 and a lower part 3, an injection moulded water distribution system 4, three water nozzle cartridges 5, a base fitting 6, and clamp ring 7.

Figure 7A:
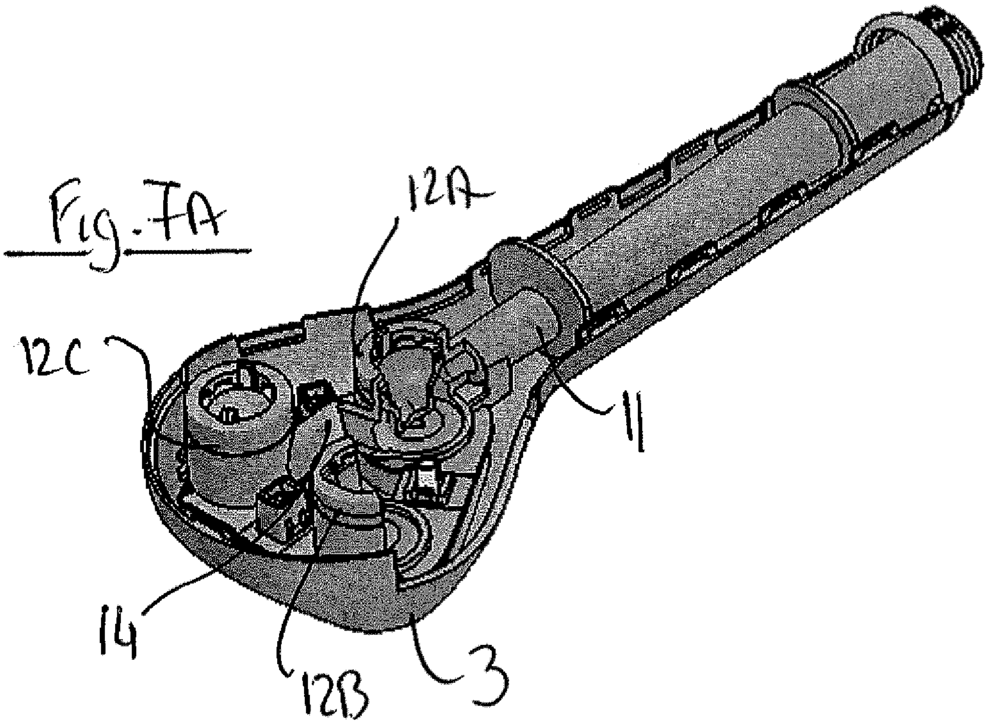
FIG. 7A is a perspective view from above of the shower head insert of the invention clipped into place in the bottom part of the shower head body.
Figure 7B:
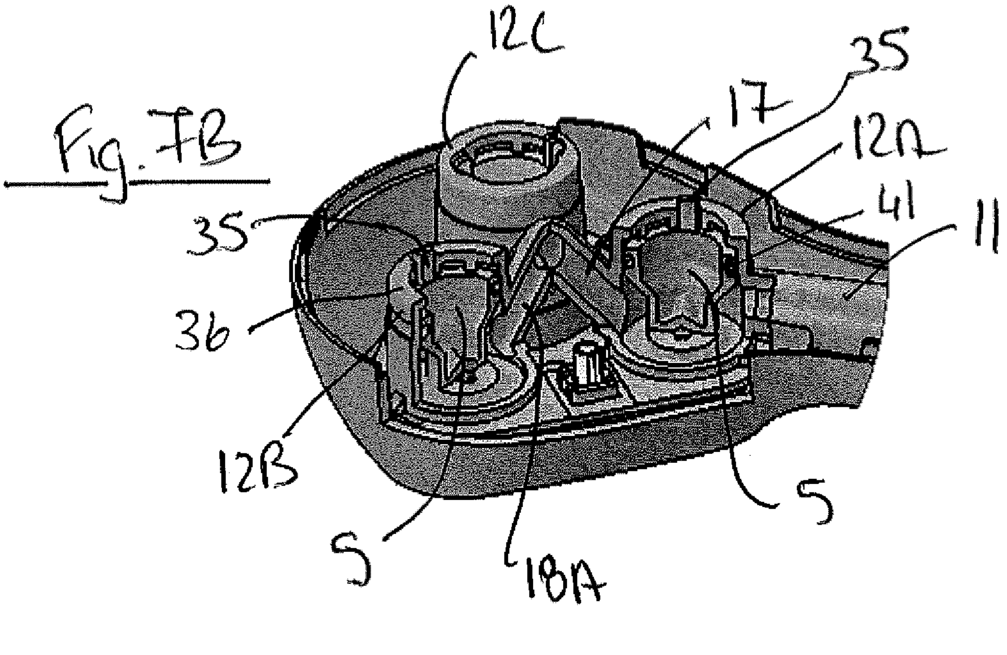
FIG. 7B is a perspective view with a cutaway of the water distribution system with a cut-away showing the inside of two of the sockets and part of the narrow bore conduit.
Figure 8A:
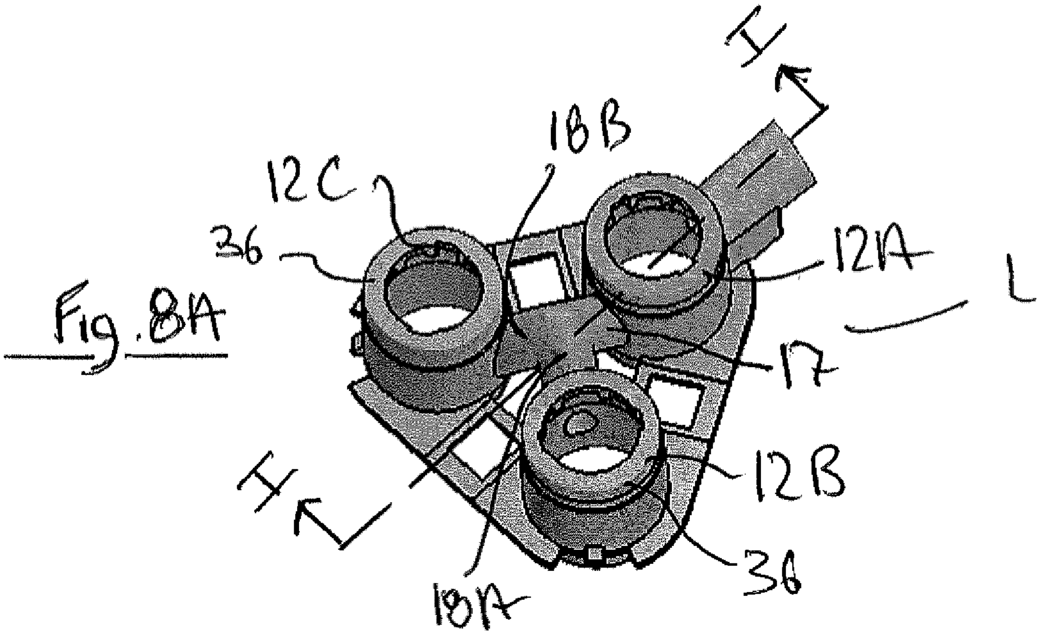
FIG. 8A is a perspective view from above of the water distribution system of the invention.
Figure 8B:
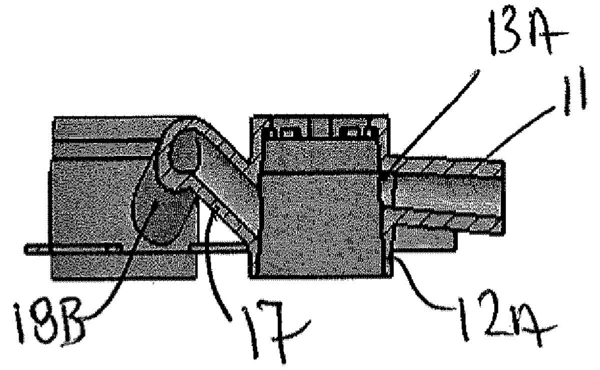
FIG. 8B is a sectional view taken along the lines I-I of FIG. 8A.
Figure 8C:
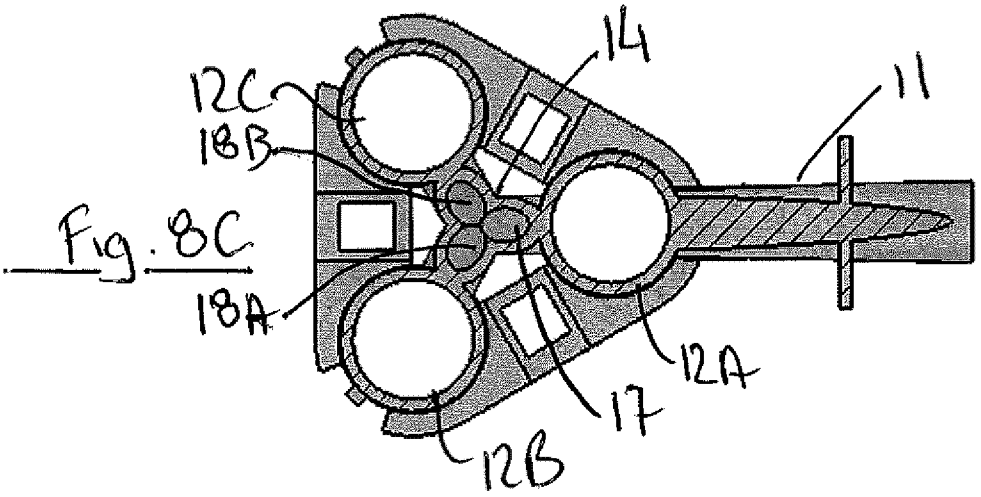
FIG. 8C is a top plan view of a section of the water distribution system taken at a mid-height of the system.

Referring also to FIGS. 7 and 8, the water distribution system comprises a central water inlet 11 that feeds into a first socket 12A through a first inlet 13A. A narrow bore conduit 14 provides fluid communication from the first socket 12A via an outlet 15 to the second and third sockets 12B and 12C. The narrow bore conduit 14 is comprises a proximal upwardly depending section 17 that bifurcates into two distal downwardly depending sections 18A and 18B that feed into the second and third sockets 12B, 12C, respectively. As indicated in FIG. 8B, the proximal upwardly depending section 17 is angled to allow an inner mould needle (not shown) be retracted from the conduit section 17 through an open base 20 of the first socket 12A, after injection moulding. Similarly, the distal downwardly depending sections 18A and 18B are angled to allow an inner mould needle (not shown) be retracted from the conduit section 17 through an open base 21 of the second and third sockets 12B, 12C, after injection moulding. Although not illustrated, it would be possible to design the system such that he inner mould needles could be removed through an open top of the sockets, with would involve providing the narrow bore conduit in an inverted form.

Referring to FIGS. 5A and 5B, a water nozzle cartridge 5 of the invention is illustrated in more details. The cartridge 5 comprises a body with a hollow upper section 25, hollow lower section 26, and waist section 27 disposed between the upper and lower sections. The purpose of the waist section is to provide an annular water channel around the cartridge when the cartridge is fitted into the socket. Annular seats 40 (FIG. 5B) are provided on the upper and lower sections of the cartridge for receipt of rubber sealing rings 41 (FIG. 5A), that in use fluidically seal the cartridge in the socket and fluidically seal with waist section 27 ensuring that no water escapes from the socket above or below the waist section thereby maintaining operational water pressure. The waist section 27 includes two angled nozzles 30 (shown in broken lines) with inlets 31 disposed on an outer face of the waist section and outlets 32 disposed to project the water jets into the lower section 26 where they impinge inside the hollow lower section and atomise, producing droplets. Locking clips 35 are provided at the top of the cartridge, and in use engage clip on to a top lip 36 of the socket. In comparison, and referring to comparative FIGS. 4A and 4B, the cartridges are squatter and have water inlets at the top A where the pressurised water is supplied, which causes a downward pressure on the cartridge, necessitating that the cartridges have threads B to allow them threadingly engage with the sockets.

Figure 1:
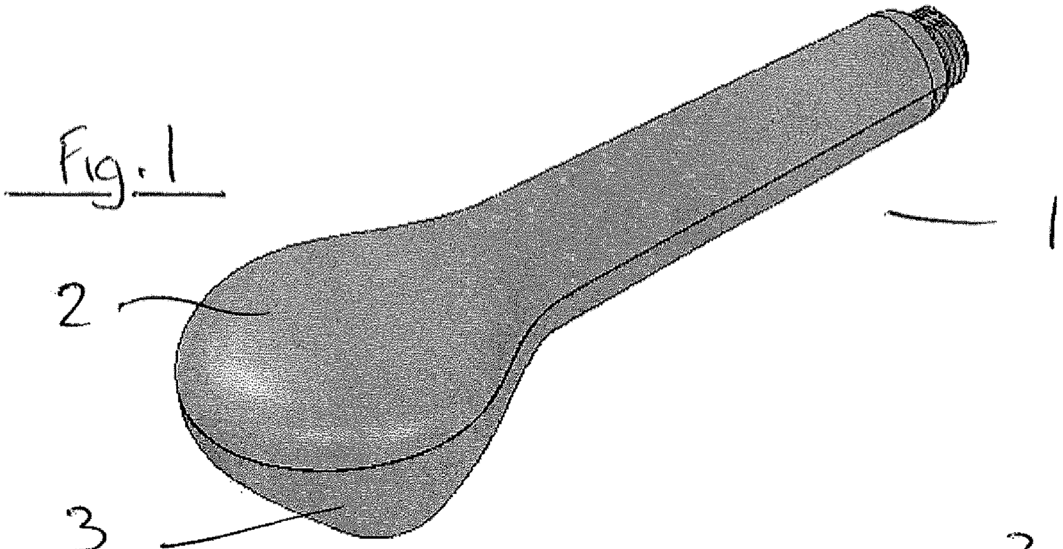
FIG. 1 is a perspective view of a shower head according to the invention, shown from above.
Figure 3:
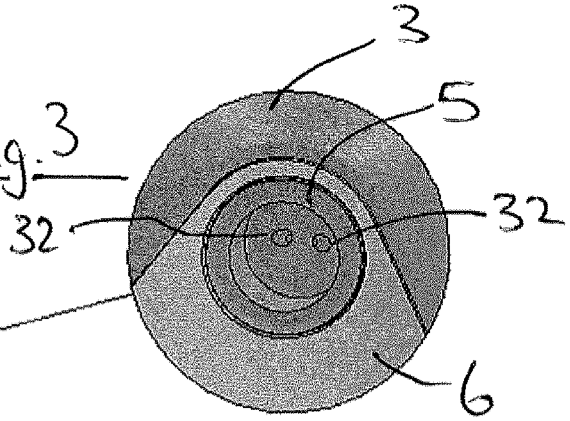
FIG. 3 is a detailed view of a part of FIG. 2 showing one of the water nozzle cartridges.
Figure 2:
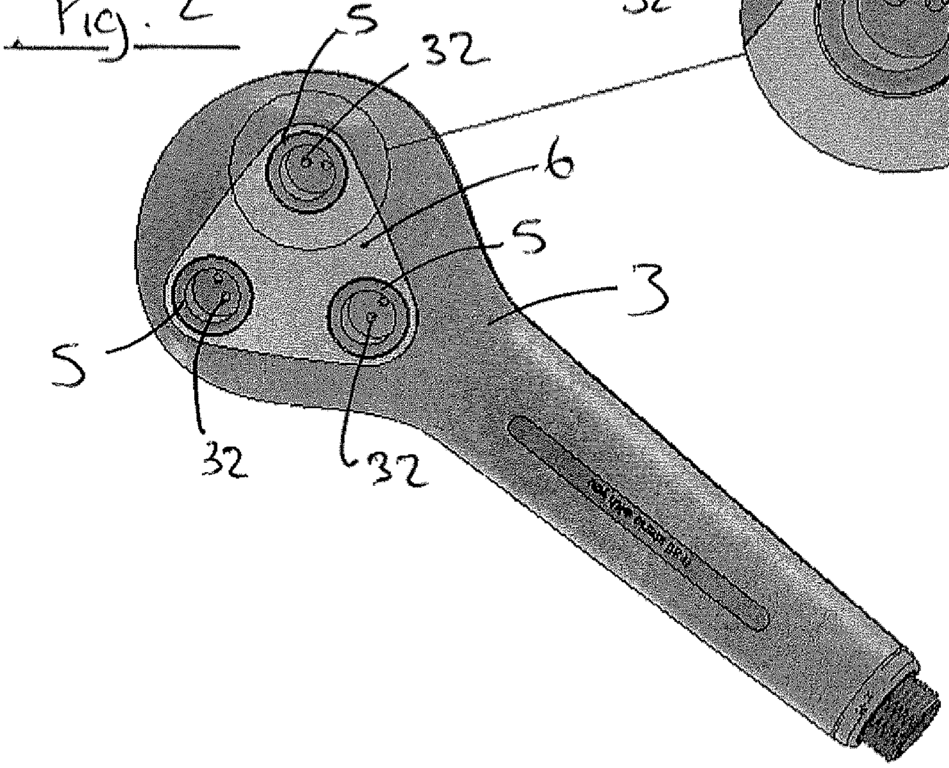
FIG. 2 is a perspective view of a shower head according to the invention, shown from below, and showing the three water nozzle cartridges.

As illustrated in FIGS. 1-3, the lower part 3 of the shower head body comprises a triangular cut-out 40 into which the base fitting 6 (which is attached to the water distribution system) fits. FIGS. 2 and 3 show the underside of the shower head, where the lower end of the cartridges 5 and water outlets 32 visible.

All of the parts are made by injection moulding. In the embodiment shown, and with reference to FIG. 6, the shower head comprises eight parts, one of which is the water distribution system which can be injection moulded in one piece. The shower head is assembled by first removing the inner mould needles from he conduits (three needles in this embodiment), and then inserting the three cartridges into their respective sockets via the open lower end of the sockets. The base fitting is then attached to the water distribution system, and then both are attached to the lower part of the shower head body. Finally, the upper part of the shower head fitting is clipped to the lower part, and the sealing ring fitted.

In use, the central water inlet conduit is fitted to a water supply, and the water turned on. High pressure water travels through the inlet conduit and into the annular conduit defined by the waist section of the cartridge and the socket, where high pressure water enters the two nozzles producing two impinging jets of high-pressure water inside the hollow section of the lower section of the cartridge. High pressure water in the annular conduit also enters the narrow bore conduit and travels to the second and third sockets where it enters corresponding annular conduits and enters the nozzles of the second and third conduits, producing two impinging jets of high-pressure water per cartridge. Thus, the shower head produces three pairs of impinging water jets which atomise to produce a shower of atomised water droplets.

EQUIVALENTS

The foregoing description details presently preferred embodiments of the present invention. Numerous modifications and variations in practice thereof are expected to occur to those skilled in the art upon consideration of these descriptions. Those modifications and variations are intended to be encompassed within the claims appended hereto.

The invention claimed is:

1. A shower head insert for a shower head, comprising:

at least two water nozzle cartridges, each having at least two nozzles configured to produce water jets that impact each other to atomise a liquid producing droplets of water; and an injection moulded one-piece water distribution system to supply liquid to the at least two water nozzle cartridges, the injection moulded one-piece water distribution system comprising:

at least two sockets for receiving the at least two water nozzle cartridges, a first water inlet conduit supplying water to a first socket of the at least two sockets, and a second connecting conduit extending from the first socket to at least a second socket of the at least two sockets providing water serially from the first socket to at least the second socket, wherein the second connecting conduit includes an angled section with respect to the first socket and the angled section includes a central longitudinal axis that extends through an open longitudinal end of the first socket, thereby allowing removal of a plurality of conduit inner mould needles from the second connecting conduit through the open longitudinal end of the first socket after injection moulding.

2. A shower head insert according to claim 1, in which the second connecting conduit comprises an upwardly depending section and a downwardly section.

3. A shower head insert according to claim 1, in which the injection moulded one-piece water distribution system comprises a third socket for receipt of water nozzle cartridges, wherein the second connecting conduit comprises a proximal upwardly depending section and at least two distal downwardly depending sections providing high-water serially from the first socket to the second socket and also to the third socket.

4. A shower head insert according to claim 1, in which each of the at least two water nozzle cartridges are configured to fit within the first socket or the second socket in a fluidically tight manner and comprises a waist section that defines a channel for water around each of the at least two water nozzle cartridges when one of the at least two water nozzle cartridges is fitted in the first socket or second socket.

5. A shower head insert according to claim 4, in which inlets for each of the at least two nozzles are disposed in the waist section.

6. A shower head insert according to claim 4, in which each of the at least two water nozzle cartridges comprise sealing means to fluidically seal the channel when the at least two water nozzle cartridges are fitted in the first socket or second socket.

7. A shower head insert according to claim 6, in which the sealing means comprises one or more resiliently deformable annular sealing rings and corresponding annular sockets to seat the one or more resiliently deformable annular sealing rings.

8. A shower head insert according to claim 1, in which the at least two water nozzle cartridges are configured to snap-fit into the at least two sockets.

9. A shower head insert according to claim 8, in which the at least two water nozzle cartridges comprise upwardly depending arms configured to engage a top of the at least two sockets.

10. A shower head insert according to claim 1, in which the at least two water nozzle cartridges are injection moulded.

11. A shower head comprising a shower head insert according to claim 1 disposed within a shower head body.

12. A shower head according to claim 11, wherein the shower head body comprises an upper part and a lower part that clip together to enclose the shower head insert.

13. A shower head according to claim 11, wherein the shower head body is overmoulded around the shower head insert.

14. A shower head according to claim 11, including a base fitting configured to lock the shower head insert, shower head body and water distribution system together.

15. A kit for assembling a shower head insert according to claim 1.

16. A shower head insert according to claim 1, wherein each of the at least two water nozzle cartridges comprise a body having an upper section with an open top, a hollow lower section with an open bottom, and a waist section disposed between the upper section with the open top and the hollow lower section with the open bottom that in use defines a channel for water around the at least two water nozzle cartridges when each of the at least two water nozzle cartridges is fitted in a socket of the shower head, wherein each nozzle comprises an inlet disposed on an outer surface of the waist section, and an outlet configured to direct a water jet into the hollow lower section such that the water jets impact each other within the hollow lower section.

17. A shower head insert according to claim 16, comprising three water nozzle cartridges, wherein the injection moulded one-piece water distribution system further comprises a first socket, a second socket, and a third socket receiving the at least two water nozzle cartridges in a fluidically tight manner, and the first socket provides high pressure liquid communication from the first socket serially to the second socket and also to the third socket.

18. A shower head insert according to claim 16, in which the upper section and hollow lower section of each of the at least two water nozzle cartridges comprise sealing means to fluidically seal the channel when the at least two water nozzle cartridges are fitted in the socket.

19. A shower head insert according to claim 17, in which a sealing means seats one or more resiliently deformable annular sealing rings and corresponding annular sockets.

20. A shower head insert according to claim 1, wherein the open longitudinal end of the first socket includes an open outlet end and a back end opposite the open outlet end, and the central longitudinal axis of the angled section extends at an obtuse angle with respect to a plane parallel to the open outlet end.

21. A shower head insert according to claim 1, wherein the second connecting conduit includes a bifurcation that connects to the second socket and a third socket and provides water serially from the first socket to both the second socket and the third socket.

* * * * *